No. 824,216. PATENTED JUNE 26, 1906.
J. K. STEWART.
SPEED MULTIPLYING POWER TRANSMITTING DEVICE.
APPLICATION FILED AUG. 3, 1905.
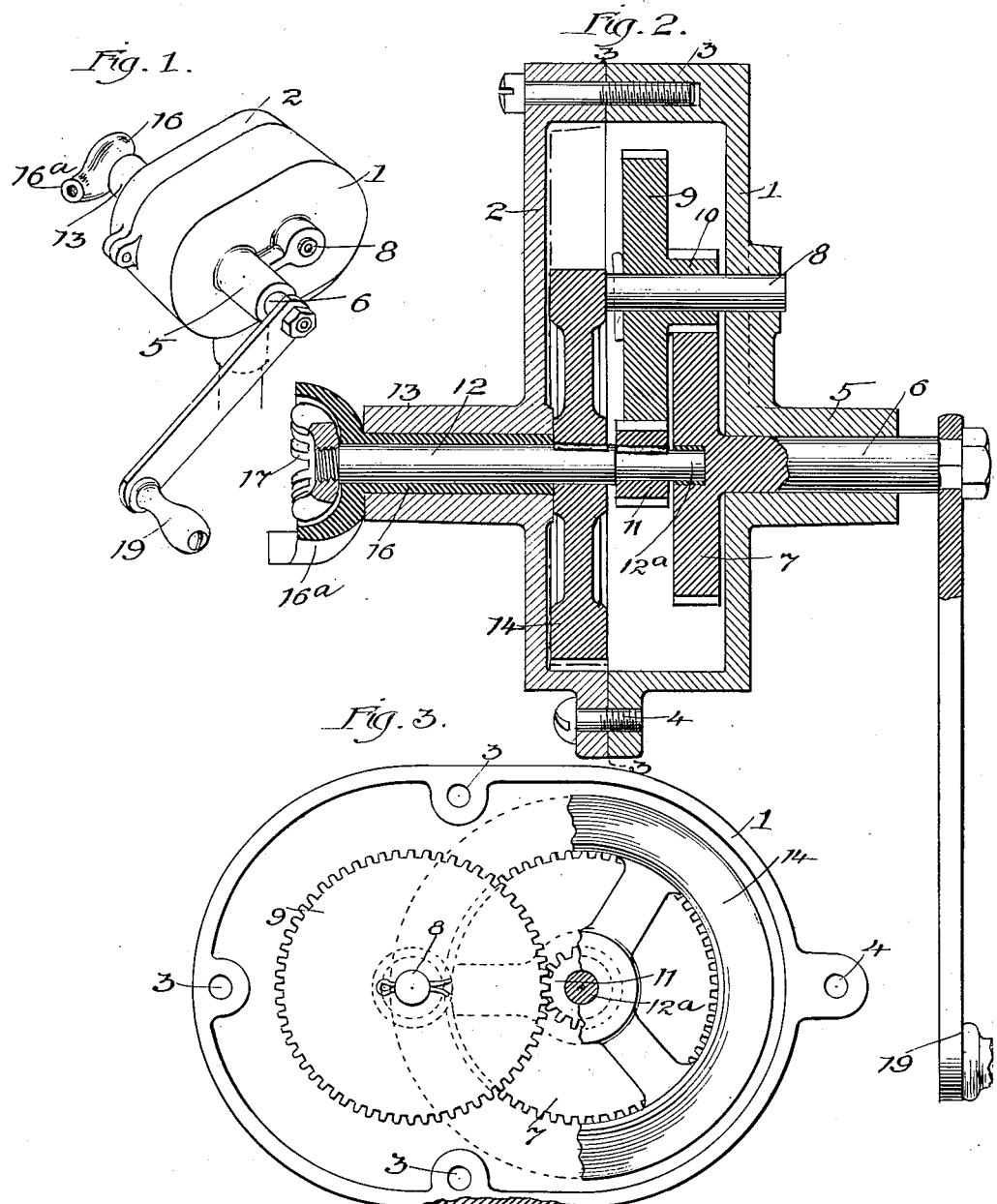
Witnesses:
Frank Blanchard
J S Abbott
Inventor:
John K. Stewart
By Burton Burton
his Attorneys.

UNITED STATES PATENT OFFICE.

JOHN K. STEWART, OF CHICAGO, ILLINOIS.

SPEED-MULTIPLYING POWER-TRANSMITTING DEVICE.

No. 824,216.  Specification of Letters Patent.  Patented June 26, 1906.

Application filed August 3, 1905. Serial No. 272,471.

*To all whom it may concern:*

Be it known that I, JOHN K. STEWART, a citizen of the United States, residing at Chicago, in the county of Cook and State of Illinois, have invented new and useful Improvements in Speed-Multiplying Power-Transmitting Devices, of which the following is a specification, reference being had to the accompanying drawings, forming a part thereof.

The purpose of this invention is to provide an improved compact speed train of gear and a case completely inclosing all the wheels thereof adapted to be mounted on a standard or bracket in any convenient manner so as to be temporarily fixed, only the shafts to and from which power is transmitted projecting therefrom.

It consists of the features of construction set out in the claim.

In the drawings, Figure 1 is a perspective view of the entire device, showing a crank-handle on the power-receiving shaft and a flexible shaft-coupling on the power-transmitting shaft. Fig. 2 is a section axial with respect to all the shafts through the entire train and case. Fig. 3 is a section at the line 3 3 on Fig. 2, with the fly-wheel partly broken away.

For the purpose of this invention I make a gear-case comprising two members 1 and 2, having their parting plane transverse to the shafts and adapted to be secured rigidly together by bolts 3 3 3 and 4. The member 1 has the long hub 5, which affords bearing for the power-receiving or driving shaft 6, said shaft being rigid and preferably integral with the gear 7 as a spindle thereof, said gear being within the case. Rigidly rooted in the web of the member 1 is a stud-axle 8, on which there is journaled a double wheel comprising the gear 9 and a pinion 10, the latter meshing with the gear 7 and the former meshing with a pinion 11 on a reduced portion 12ª of the power-transmitting shaft 12, that shaft being journaled in a long hub 13 of the member 2 of the case and having rigid with it within the case a fly-wheel 14 on the unreduced portion of the shaft. The gear 7 has at the center on the face toward the pinion 10 at the center a socket for a bearing 15 for the reduced portion 12ª of the shaft 12, which, it will be understood, is coaxial with the shaft 6, and the mutual engagement of the two shafts with each other, in addition to the long bearings 5 and 13, with which both shafts are provided, assists in preserving them in alinement with each of them, thus obtaining substantially the advantage of the long bearing of the other for that purpose. The specific use for which this device is specially intended being to drive flexible shafting, there is shown on the shaft 12 a familiar form of flexible shaft-coupling 16, consisting of the sleeve which extends into the bearing 13 and at the outer end of the bearing has the flange 16ª, which constitutes one of the members of a hinge-coupling, the other of which (not shown) is identical in form and constitutes the bearing of the next member of the flexible shaft, (not shown,) the said coupling 16 being longitudinally stopped on the shaft 12 and in the hub 13 by the gear element 17, screwed fast onto the end of the shaft 12 outside within the cup or cavity of the flange 16ª. These features pertaining to flexible shaft-couplings being of familiar form, their construction and use need not be further described, especially as the present invention is not limited to use with such flexible shaft-couplings, though especially adapted for the purposes in connection with which flexible shafts are much used.

For the purpose of mounting the case on a standard or bracket the member 1 has a hollow interiorly-threaded boss 18, projecting from one side edge midway in the length. A threaded stem of a portable standard or wall-bracket (not shown) may thus receive the entire device, and a crank-handle 19 being applied to the shaft 6 to drive the train adapts it to be employed with especial convenience in communicating power to any tool which may be driven by a flexible shaft connected to the outleading shaft 12, which has by means of the train a speed multiplied many times over that of the crank. In the train, as illustrated, the speed of the alternating shaft is sixteen times that of the crank.

I claim—

A speed-multiplying device comprising a two-part housing and a gear-train completely inclosed therein, the initial and final shafts of the train being coaxial and protruding from opposite sides of the housing, the parting plane of the two members of the housing being transverse to all the shafts, one of said members having a threaded boss projecting from the edge of the housing in a
5 plane transverse to the shafts, for mounting the housing on a threaded stem or standard.

In testimony whereof I have hereunto set my hand, at Chicago, Illinois, this 1st day of August, 1905.

JOHN K. STEWART.

In presence of—
   LEANDER H. LA CHANCE,
   M. GERTRUDE ADY.